Oct. 19, 1937.   W. R. NICHOLAS   2,096,335
SHEET METAL NUT
Filed Aug. 20, 1935
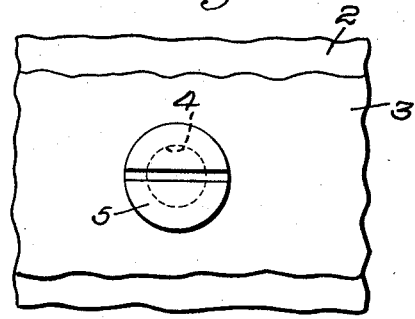
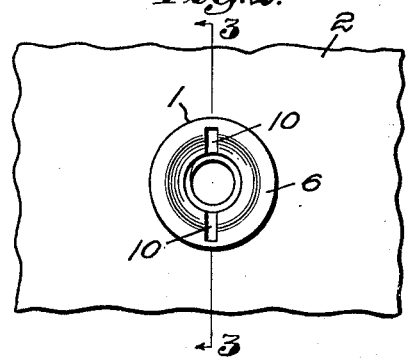
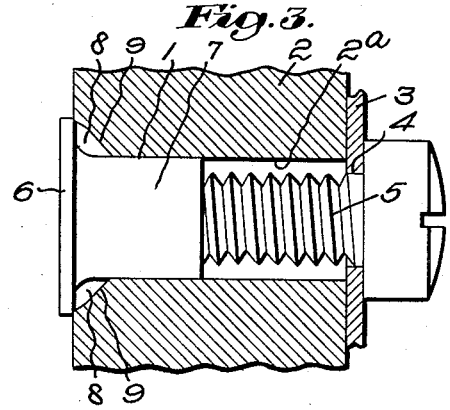
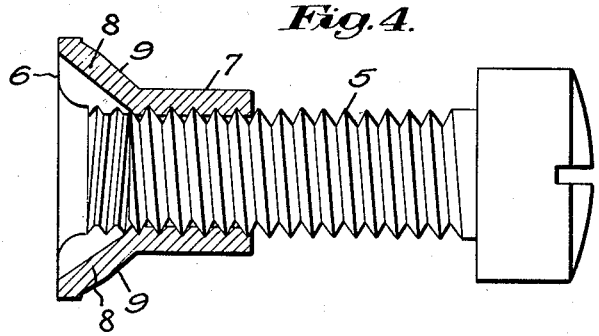
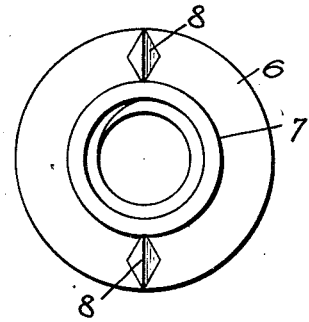
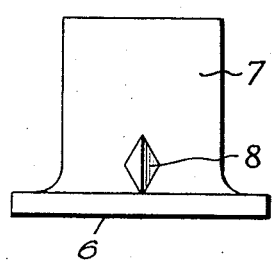
Inventor:
William R. Nicholas
by Walter S. Jones
Atty Patented Oct. 19, 1937

2,096,335

UNITED STATES PATENT OFFICE 2,096,335

SHEET METAL NUT

William R. Nicholas, Dorchester, Mass., assignor to United-Carr Fastener Corporation, Cambridge, Mass., a corporation of Massachusetts Application August 20, 1935, Serial No. 37,025

1 Claim. (Cl. 85—32)

My invention aims to provide improvements in nuts and nut and screw fastened installations.

In the drawing which illustrates a preferred embodiment of my invention:

Figure 1 is a front plan view of a nut installation showing a screw head, a metal plate and the nut supporting part;

Fig. 2 is a rear view of the installation shown in Fig. 1 including my improved nut member and the nut supporting part;

Fig. 3 is an enlarged section taken along the line 3—3 of Fig. 2;

Fig. 4 is an enlarged section of the nut and screw members shown in Fig. 3;

Fig. 5 is a top view of my improved nut member; and

Fig. 6 is a side view of my improved nut member.

It is well known that it is necessary in connection with nuts of the type illustrated to provide a means for preventing the nut from rotating when attached to part of an installation. The type of nut most commonly in use is provided with a plurality of projections pressed outwardly from the base flange. The obvious disadvantage of this last-mentioned form of nut lies in the fact that a relatively wide base must be used in order to provide material from which the projections may be fashioned. One of the objects of my present invention is to reduce the size of the nut base thereby saving a substantial amount of material, and, at the same time, provide suitable projections, as will be hereinafter more fully set forth.

Another object of my invention is to provide the tool-receiving slots in the nut so that a suitable tool may be inserted therein, when it should be found necessary, for holding the nut against relative turning while the screw is being engaged therewith. These slots also provide a convenient and satisfactory means for receiving a tool to tighten the nut on the screw member if, for any reason, no tightening means is provided on the screw.

Referring in more detail to my invention, I have illustrated in Figs. 1, 2, and 3, a preferred but and screw installation comprising a nut 1, a supporting part 2 to which the nut is attached, a bore 2a in the supporting part, a thin metal plate 3 having an aperture 4, and a screw member 5 extending through the aperture 4 of the plate 3 into threaded engagement with the nut 1 thereby holding all the parts in assembled relation.

The more important features of my invention are contained in the particular formation of the nut member 1 which, as most clearly illustrated in Figs. 4, 5, and 6, is made, in my preferred form, of a single piece of sheet metal and has a relatively small base flange 6 (Figs. 5 and 6) and a hollow shank 7 drawn from the metal of the base 6 and threaded internally to cooperate with the threaded screw member 5.

At opposite points on the nut 1, I have provided the hollow fin-shaped projections 8 which have been pressed from the material of the base 6 and the shank 7 and located on the outside surface of the nut so that the free edge 9 of the projections will join the shank 7 with the base 6, as most clearly illustrated in Figs. 3 and 4. Due to the fact that in my preferred form the greater part of each projection is located on the shank of the nut and only a small fraction on the base flange, it is possible to fashion the nut from a very small blank thereby saving an appreciable amount of material and in no ways lessening the mechanical efficiency of the nut member.

As a result of pressing the projections 8 from the material of the base and the flange, there have been provided, in my preferred form, the slots 10 (Fig. 2) which extend from substantially the mid-portion of the underside of the base flange 6 into the interior of the hollow shank 7.

When the screw member is tightened in engagement with the nut, the projections 8 will be drawn into the support 2 (Fig. 3) and any rotation of the nut will be prevented, and after the nut and screw are in final engagement the projections embedded in the support will aid in preventing the nut from becoming unloosed.

The slots 10 formed in the underside of the nut are particularly useful in the case of drawer handles or the like in which, for appearance or other reasons, no tightening means is provided on the stud member. In such a case the stud member is inserted in the supporting part and the nut 1 is tightened on the stud by means of a tool which is received by the slots of the nut.

The nut described is composed of a minimum amount of material, is of very simple construction, and equal in efficiency to any which has been devised for the same purposes.

While I have illustrated and described a preferred form of my invention, I do not wish to be limited thereby, because the scope of my invention is best defined by the following claim.

I claim:

A sheet metal nut having a relatively small base adapted to bear against one face of an apertured member, an internally threaded hollow shank drawn from the material of said base and adapted to seat in the aperture in said member, hollow deformations pressed from the material of said sheet metal nut at the junction of the base and the hollow shank, said hollow deformations providing elongated tool receiving slots in the open face of said nut and said deformations also defining elongated fin-shaped projections on the underface of the base extending into engagement with said member to prevent rotation of said nut.

WILLIAM R. NICHOLAS.